United States Patent [19]

Slocum et al.

[11] Patent Number: 4,736,193
[45] Date of Patent: Apr. 5, 1988

[54] PROGRAMMABLE FLUID DETECTOR

[75] Inventors: Laurence S. Slocum; Sara M. Mussmann, both of Indianapolis, Ind.

[73] Assignee: Emhart Industries, Inc., Indianapolis, Ind.

[21] Appl. No.: 944,215

[22] Filed: Dec. 22, 1986

[51] Int. Cl.$^4$ .................... G08B 19/00; G01B 21/00
[52] U.S. Cl. .................... 340/522; 340/603; 340/604; 340/605; 340/620; 73/40.5 R; 73/61.1 R; 324/61 P
[58] Field of Search ........ 340/522, 521, 517, 603–605, 340/620, 624, 825.1–825.13, 825.22; 73/40.5 R, 80, 40.7, DIG. 8, 61.1 R; 324/61 R, 61 P, 65 RP

[56] References Cited

U.S. PATENT DOCUMENTS

| | | | |
|---|---|---|---|
| 3,882,465 | 5/1975 | Cook et al. | 340/825.21 |
| 4,644,354 | 2/1987 | Kidd | 340/605 |
| 4,646,069 | 2/1987 | Andrerasich et al. | 340/605 |

Primary Examiner—Donnie L. Crosland
Attorney, Agent, or Firm—Carl A. Forest

[57] ABSTRACT

A plurality of probes for sensing their fluid environment are electrically connected to a controller. The controller includes an alarm transducer, relays, a keyboard, and a display connected to a microprocessor and associated memories. Under keyboard control and software direction the microprocessor is operable in a monitor mode in which it monitors the probes and activates the transducer, relays, and display in response to probe signals corresponding to selected alarm conditions, and in a program mode in which the alarm conditions, relay latching conditions, and probe to relay assignments may be selected via the keyboard. A hardware timer interrupts the microprocessor periodically to clock a software timer which provides six second and six minute timers. When monitor mode is exited, the six second timer is reset and if a security code is not entered in six seconds the timer elapses and the system returns to monitor mode. Similarly, when program mode is entered, the six minute timer is reset and if no program entries are made in six minutes, the system returns to monitor mode. The six minute timer is reset each time a program entry is made and is delayed so long as probe to relay assignments are being made.

12 Claims, 8 Drawing Sheets

| SW1 PROG. | SW2 PROBE | SW3 RELAY |
| --- | --- | --- |
| SW4 DRY | SW5 OIL | SW6 WET |
| SW7 ENTER | SW8,D4 N.O. | SW9,D5 N.C. |
| SW10,D2 TEST | SW11,D2 STOP SCAN | SW12 EXIT |
| SW13,PUSH ALARM CHK | SW14,D1 AUD ALARM | SW15 ERROR |

PROGRAMMABLE FLUID DETECTOR

BACKGROUND OF THE INVENTION

This patent application includes a microfiche appendix comprising the preferred software according to the invention.

1. Field of the Invention

The present invention in general relates to programmable fluid detectors and more particularly to such detectors that can differentiate between the presence of hydrocarbons, water, and the dry condition.

2. Description of the Prior Art

The contamination of ground water by hydrocarbon leaking from underground tanks has become a serious problem in recent years, and leak detectors that can monitor the environment in the vicinity of a tank and can differentiate between hydrocarbon, water and the dry condition and provide an alarm on the detection of hydrocarbon have been developed. See, for example, U.S. Pat. No. 4,586,033 issued to Raymond J. Andrejasich. Generally, such detectors include many probes connected to a central controller. One such detector has provided a programmable relay which can be set to be activated upon any combination of dry, hydrocarbon, or water. See U.S. Pat. No. 4,644,354.

As the geophysical environments of hydrocarbon storage tanks and the nature of the failure of such tanks have become more fully understood by those skilled in the art of leak detectors, it has become clear that a detector that is more fully programmable would be highly desirable. Such a detector would be adaptable to a wider variety of probe environments: e.g. environments outside a tank or between the walls of a double-walled tank, and environments in which ground water is normal (and tank construction has taken this into account) and environments that are normally dry and in which water may result in an increased potential for problems. Likewise, depending on the particular tank and probe environment and the particular needs of the tank owner many different responses to a leak or change in environment may be desirable. However, a more highly programmable detector is necessarily more complex and, because of the critical function that leak detectors perform, it is essential that in providing the increased flexibility and usefulness of a programmable detector, the basic safety and reliability of the system not be diminished. Since leaks and other hazards may develop in a matter of hours, and sometimes minutes, one important aspect of safety is that the complexity does not result in the inadvertent failure to monitor the probes for an extended period of time.

SUMMARY OF THE INVENTION

In this specification the term "alarm" includes both visual and auditory alerting devices. The term "remote terminal" includes both intelligent and non-intelligent electronic monitoring or reporting devices.

It is an object of the invention to provide a programmable fluid detector that is safe and reliable.

It is another object of the invention to provide the above object in a fluid detector having two or more operational modes including a probe monitoring mode and at least one non-monitoring mode, which detector returns to the monitoring mode if left in a non-monitoring mode.

It is a further object of the invention to provide the above objects in a fluid detector having a monitoring mode and a programming mode, which detector returns to the monitoring mode if no programming entries are made for a predetermined time.

It is yet another object of the invention to provide one or more of the above objects in a fluid detector that has a non-monitoring mode that requires manual information entries into the system and which returns to monitoring mode after a short time if the next proper entry in the non-monitoring mode is a prescribed entry requiring little or no choice and/or little or no thought or analysis and returns to the monitoring mode after a longer time if the next proper entry is an entry permitting several choices and/or requiring significant thought or analysis.

It is still another object of the invention to provide one or more of the above objects in a fluid detector having a test mode during a portion of which visible indication that the system is in test mode is not feasible and which returns to monitor mode if no test entry is made for a predetermined time during the portion of the test mode in which such visible indication is not given.

It is still another object of the invention to provide one or more of the above objects in a fluid detector that requires a security code to be entered to enter the programming mode, and which places the system in monitor mode if the security code is not entered within a predetermined time.

The invention provides a fluid detector comprising a plurality of probe means for sensing their fluid environment, each probe means including means for providing one or more of the following signals: a hydrocarbon signal indicative of the presence of hydrocarbon in the probe environment, a water signal indicative of the presence of water in the probe environment, and a dry signal indicative of a dry probe environment; manual entry means for selecting one or more programmable conditions, memory means for storing the selected conditions; timing means for clocking a predetermined time; processing means for receiving the selected conditions and storing them in the means for storing and for monitoring the probe signals and providing an alarm signal upon receiving one or more probe signals corresponding to one or more of the selected conditions, the processing means capable of operating in a monitoring mode in which it monitors and processes the probe signals and in a programming mode in which it receives and stores the selected conditions; means for resetting the timing means upon entry of one or more predetermined entries on said entry means and for placing the processing means in the monitoring mode after the timing means clocks the predetermined time; and alarm means responsive to the alarm signal for providing an alarm. Preferably, the timing means comprises a means for clocking a first predetermined time and a second predetermined time, and the means for placing comprises a means for placing the processing means in the monitoring mode after the timing means clocks the first predetermined time during a first portion of the programming mode and for placing said processing means in the monitoring mode after the timing means clocks the second predetermined time during a second portion of the programming mode. Preferably the alarm means includes one or more relays, the processing means further comprises a means for latching one or more of the relays upon receiving one or more probe signals corresponding to one or more of the selected alarm conditions, the programming mode includes a probe programming mode and a relay programming mode, the manual entry means includes a means for selecting one of the probe and relay programming anodes, the first portion of the programming mode comprises a portion in which the next proper entry is the selection of either the probe or the relay mode, and the second portion of the programming mode is a portion in which the one or more conditions are to be selected. Preferably the manual entry means also comprises a means for entering a security code, and the means for resetting and placing further comprises means for placing the processing means in the programming mode if a predetermined security code is entered within the predetermined time.

The fluid detector according to the invention is the first hydrocarbon leak detector system in which probes in wells outside of tanks and probes in the walls of double-walled tanks can be effectively used at the same time and which also provides the safety of nearly constant monitoring even if it is inadvertently left in programming mode. Numerous other features, objects and advantages of the invention will become apparent from the following detailed description when read in conjunction with the accompanying drawings.

DESCRIPTION OF THE PREFERRED EMBODIMENT

Figure 1:
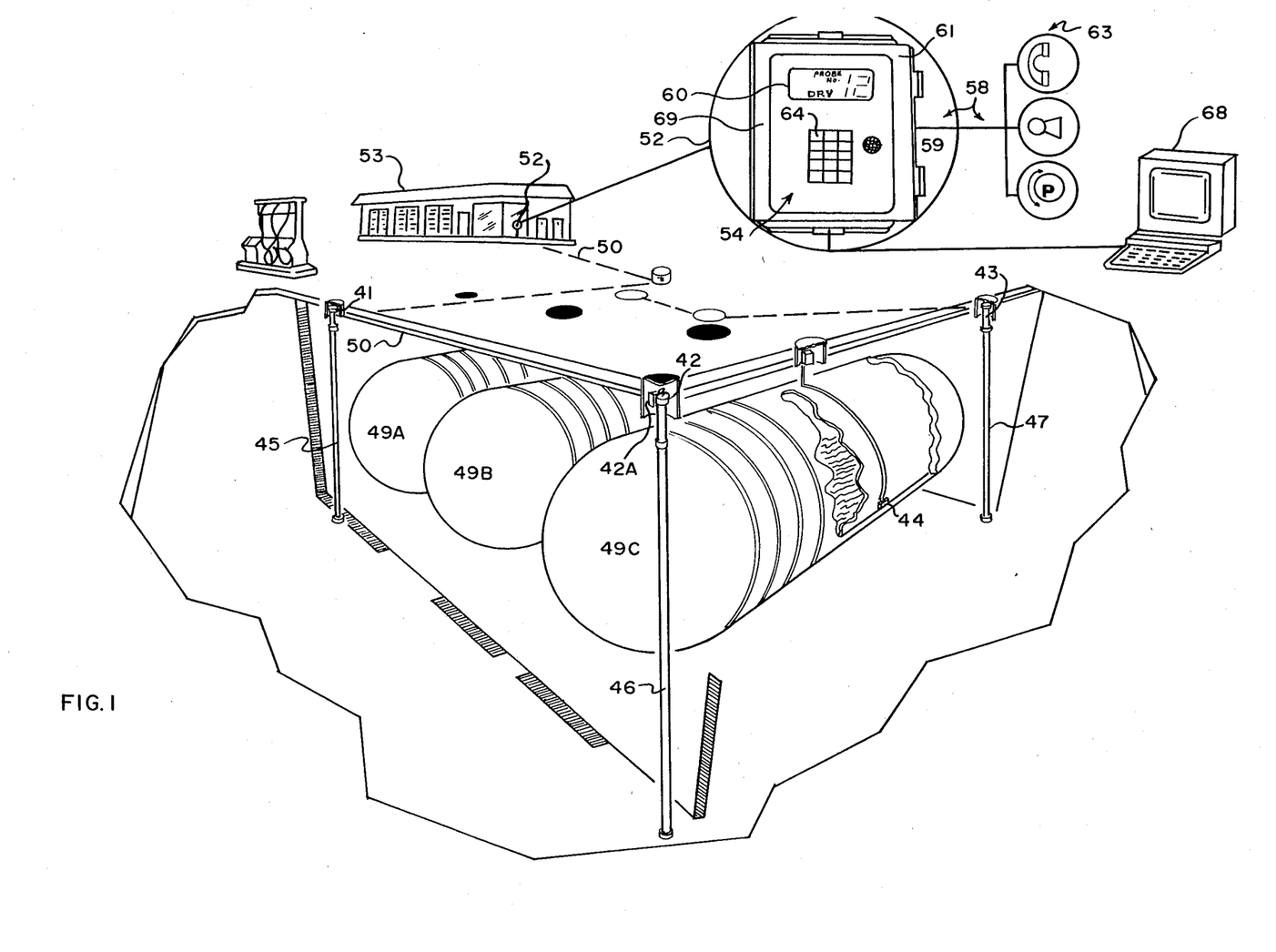
FIG. 1 is a partially cut away illustration showing a fluid detection system according to the invention installed at a gasoline station.
Figure 5:
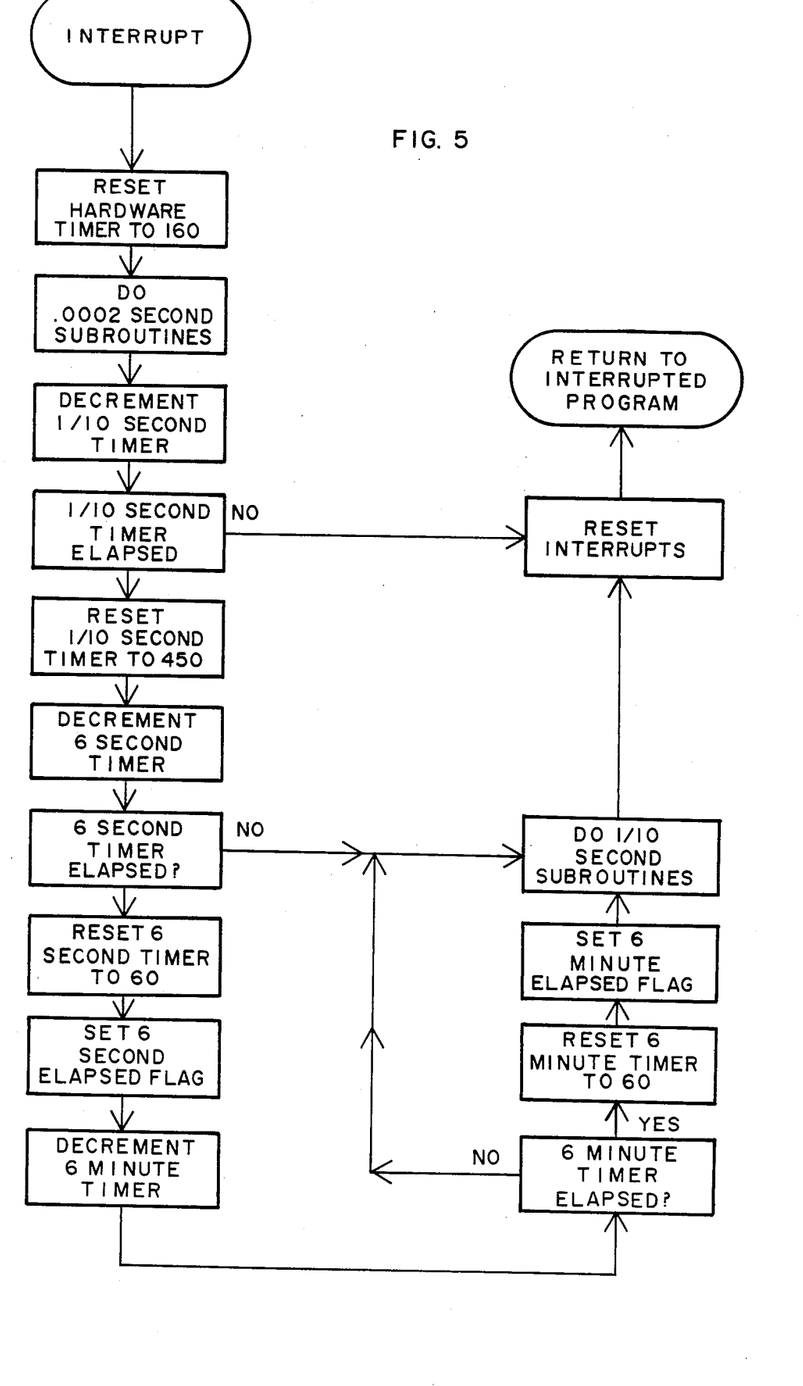
FIG. 5 is a flow chart showing the essential steps of the software timer according to the preferred embodiment of the invention.

FIG. 1 illustrates the preferred embodiment of the invention as it may be installed at a gasoline station. A plurality of probe means 41, 42, 43 and 44 sense their environment and provide signals over cable 50 to a controller 52 which would generally be located in the service building 53. Some probes, such as 41, 42, 43 may be located in wells 45, 46 and 47 respectively, external to gasoline tanks 49A, 49B and 49C. Other probes, such as 44, may be located between the walls of a double-walled tank, such as 49C. The invention contemplates that other types of probes may also be used. Controller 52 includes a manual entry means 54 and, within controller 52 (FIG. 2) a memory means 55, a timing means 56 and a processing means 57. A means for resetting the timing means and for placing the processing means 57 in monitor mode preferably comprises an EProm 72 containing software, flow charts for which are shown in FIGS. 6 through 9. Controller 52 also includes an alarm means 58 which preferably comprises an alarm transducer 59 and display 60 mounted on the front panel 61 of controller 52, relays 62 (FIG. 2) within the controller 52 which may activate a variety of alarm devices 63 in the vicinity of station 53 or remote from the station. The manual entry means 54 preferably includes a keyboard 64 and associated electronics (FIG. 2), the processing means 57 includes microprocessor 70, peripheral interface adapters 73 and 74 and associated electronics, the memory means 55 includes a RAM in microprocessor 70 and a non-volatile RAM 71, and the timing means 56 includes an oscillator 90 and associated electronics, a hardware counter in microprocessor 70 and a software timer shown in FIG. 5.

Turning to a more detailed description of the invention, the probes 41, 42 and 43 may be probes such as described in U.S. Pat. No. 4,586,033 having a probe interface as described in U.S. Pat. No. 4,646,069 which patents are hereby incorporated by reference. Probe 44 may be a probe as described in U.S. Pat. No. 4,660,026, hereby incorporated by reference, with a probe interface as described in U.S. Pat. No. 4,649,069. Each probe includes a means, such as 42A, for providing one or more probe signals. Cable 50 is preferably an eight-wire shielded electrical cable. Controller 52 is preferably enclosed in a metal or plastic case 69.

Figure 2:
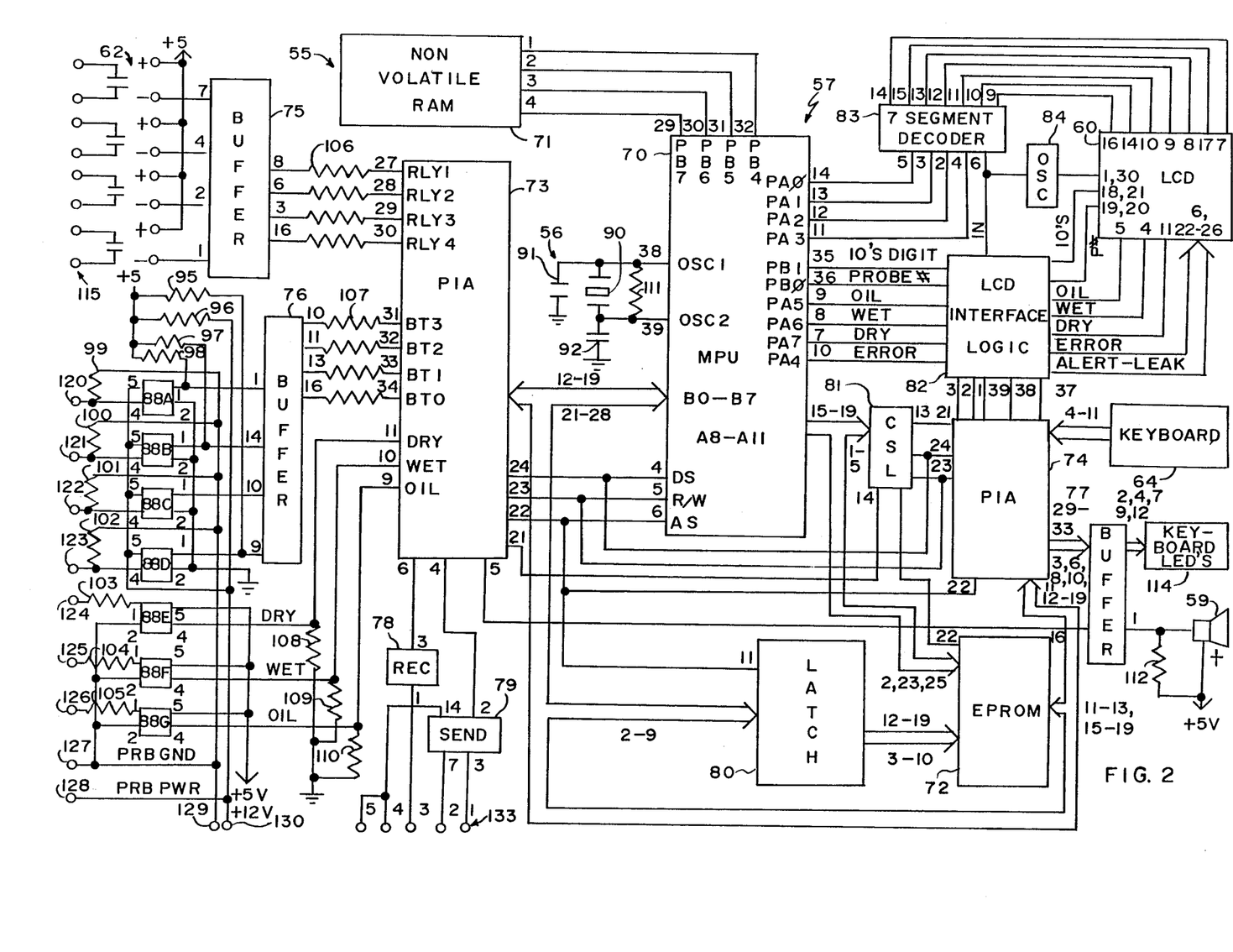
FIG. 2 is a detailed electrical circuit diagram of the preferred embodiment of the controller according to the invention.

The preferred electrical circuit enclosed in case 69 is shown in FIG. 2. The circuit includes microprocessor 70, non-volatile RAM (NOVRAM) memory 71, EPROM memory 72, peripheral interface adaptors (PIA) 73 and 74, buffers 75, 76 and 77, receiver 78, transmitter 79, latch 80, chip select logic 81, LCD interface logic 82, 4 line to 7 segment decoder 83, oscillator 84, opto-isolators 88A through 88G, crystal oscillator 90, capacitors 91 and 92, resistors 95 through 112, keyboard LED's 114, terminals 115, 120–130, and 133, and the transducer 59, relays 62, keyboard 64, and LCD 60 which were discussed with reference to FIG. 1. The numbers on the input and output lines of the various electrical components are the pin numbers of the preferred components which will be listed below. These pin numbers are placed external to the rectangles representing the devices, except in the case of the LCD 60 where they are in the interior for clarity. On the thicker connector lines which represent multiple electrical lines the pin numbers on the top of the lines are those of left-hand IC, while the pin numbers beneath the line are those of the IC on the right. The letters interiorly of the IC rectangles, such as the "PB7" near pin 29 of microprocessor 70, are the labels of the internal signal applied to the pin. In FIG. 2, power supplies and connections to the power supplies and grounds are generally not shown when they are conventional. Beginning with the mircoprocessor 70, the electrical connections are as follows. Microprocessor pin numbers 29–32 are connected to non-volatile RAM pins 4, 3, 2 and 1 respectively. Pin 38 is connected to ground through capacitor 91 and to pin 39 through crystal oscillator 90 and resistor 111 in parallel. Pin 39 is also connected to ground through capacitor 92. Pins 21 through 28 of microprocessor 70 are connected to pins 19 through 12 respectively of peripheral interface adaptor 73, to pins 9 through 2 respectively of latch 80, pins 19, 18, 17, 16, 15, 13, 12, and 11 respectively of E PROM 72 and pins 19 through 12 respectively of PIA 74. Pins 4, 5 and 6 of microprocessor 70 are connected to pins 24, 23 and 22 respectively of PIAs 73 and 74. Pin 6 of microprocessor 70 is also connected to pin 11 of latch 80 while pins 4 and 5 are also connected to chip select logic 81. Pins 15-19 of microprocessor 70 are connected to pins 4, 5, 3, 2, 1 respectively of chip select logic 81, and pins 2, 23, 21, 24 and 25 respectively of EPROM 72. Pins 9, 8, 7 and 10 of microprocessor 70 are connected through LCD interface logic 82 to pins 5, 4, 11, and 15 respectively of LCD 60. Pin 35 of microprocessor 70 is connected through LCD interface logic 82 to pins 18 and 21 of LCD 60 while pin 36 is connected through logic 82 to pins 19 and 20 of the LCD. Pins 11 through 14 of microprocessor 70 are connected to pins 4, 2, 3 and 5 respectively of decoder 83. Pins 27 through 30 of PIA 73 are connected to pins 8, 6, 3 and 16 respectively of buffer 75. Pins 7, 4, 2 and 1 of buffer 75 are connected to the negative terminal of each of the relays. The positive terminal of each relay is connected to the +5 V system power supply. Each relay has a pair of output terminals which are shown at 115. Pins 31 through 34 of PIA 73 are connected to pins 10, 11, 13 and 16 respectively of buffer 76. Pins 1, 14, 12 and 9 of buffer 76 are connected to the number 1 pin of opto-isolators 88A through 88D respectively and to the +5 V power supply through resistors 98, 97, 96 and 95 respectively. The number 2 pin of each of opto-isolators 88A through 88D is grounded. The number 5 pin of each of opto-isolators 88A through 88D is connected to the positive 12 V probe power supply. Pin 4 of opto-isolators 88A through 88D are connected to outputs 120 through 123 respectively and also are each connected to the probe ground (a floating ground independent of the other system grounds) through resistors 99 through 102 respectively. Pins 9, 10 and 11 of PIA 73 are connected to the number 4 pins of opto-isolators 88G, 88F and 88E respectively and also to ground through resistors 110, 109 and 108 respectively. The number 5 pin of each of opto-isolators 88E, 88F and 88G are connected to the +5 V power supply while pin 2 of each is connected to the probe ground. Pin 1 of opto-isolators 88E, 88F and 88G are connected to output terminals 124, 125 and 126 respectively through resistors 103, 104 and 105 respectively. Output terminal 127 is connected to the probe ground while terminal 128 is connected to the +12 V probe power supply. Pin 6 of PIA 73 is connected to pin 3 of receiver 78 and pin 1 of receiver 78 is connected to the number 3 pin of output terminal block 133. The number 4 pin of PIA 73 is connected to the number 2 pin of transmitter 79. The number 14 pin of transmitter 79 is connected to the number 4 and 5 pins of terminal block 133, while its number 7 and 3 pins are connected to the number 2 and 1 pins of terminal block 133. The number 5 pin of PIA 73 is connected to the number 16 pin of buffer 77 while the number 21 pin of PIA 73 is connected to the number 14 pin of chip select logic 81. The number 12 through 19 pins of latch 80 are connected to pins 3 through 10 of EPROM 72. The number 13 pin of chip select logic 81 is connected to the number 21 pin of PIA 74. One chip select logic output is connected to pin 22 of EPROM 72. The connections of PIA 74 to keyboard 64 and buffer 77 will be discussed in reference to FIG. 3. The output of oscillator 84 is applied to pin 6 of decoder 83, to pins 1 and 30 of LCD 60 and to the timing input of LCD interface logic 82. The number 3, 2, 1, 39, 38 and 37 pins of PIA 74 are applied to pins 6, and 22 through 26 of LCD 60 through LCD interface logic 82.

Figure 3:
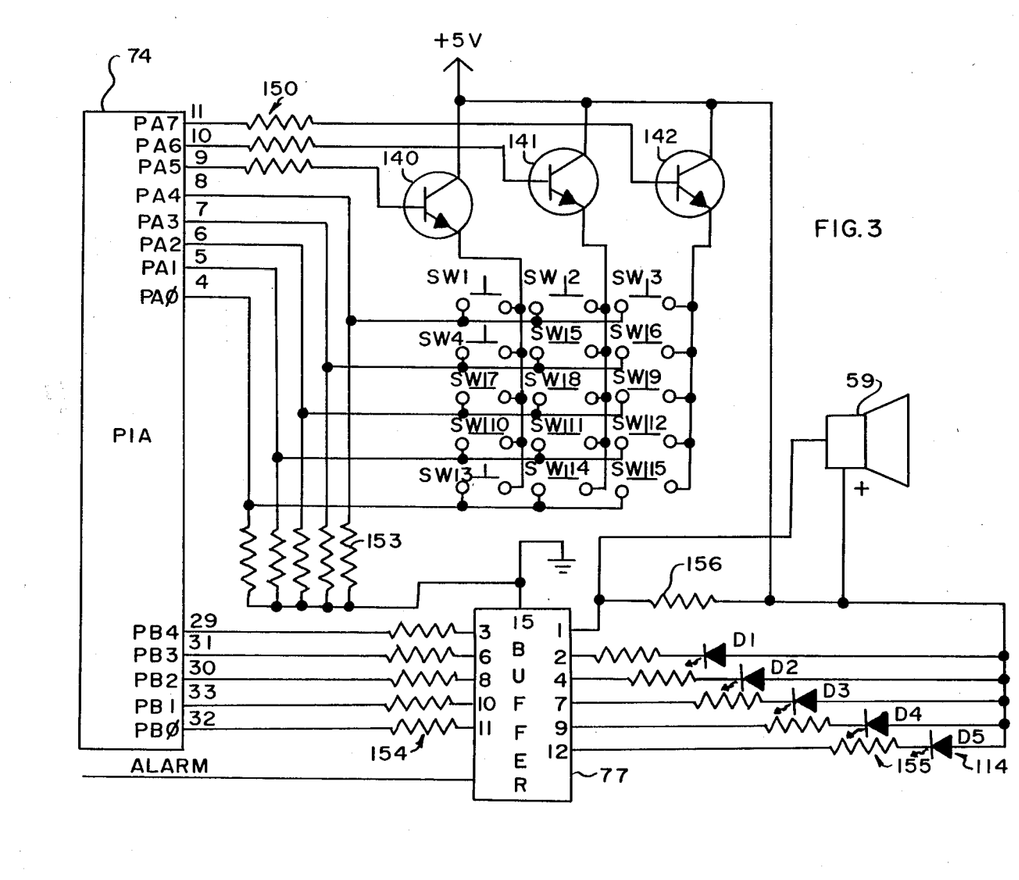
FIG. 3 is a detailed electrical circuit diagram of the keyboard, alarm and associated circuits according to the invention.
Figure 4:
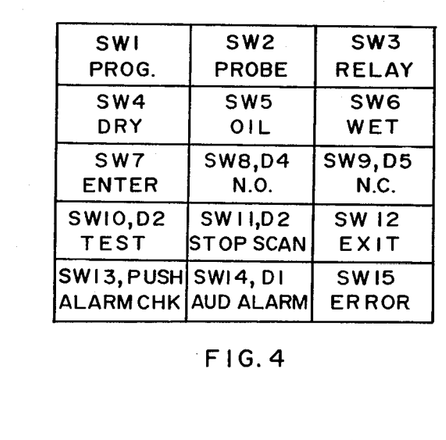
FIG. 4 shows the keyboard switch labeling and the locations of the keyboard LED's in the preferred embodiment of the invention.

Turning now to FIG. 3, details of the keyboard 64, alarm 59, and associated circuitry are shown. This circuit comprises key switches SW1 through SW15 arranged in a 3 by 5 switch keyboard, transistors 140, 141, and 142, buffer 77, transducer 57, LED's 114 (D1 through D5) and resistors 150 through 156. One side of each of switches SW1, SW2, and SW3 is connected to pin 8 of PIA 74. Similarly one side of switches SW4, SW5 and SW6, SW7, SW8 and SW9, SW10, SW11 and SW12 and SW13, SW14 and SW15 are connected to pins 7, 6, 5, and 4 respectively of PIA 74. Each of pins 4 through 8 of PIA 74 is also connected to ground through one of resistors 153. The other side of each of switches SW1, SW4, SW7, SW10 and SW13 is connected to the emitter of transistor 140. Likewise the other side of switches SW2, SW5, SW8, SW11 and SW14 and SW3, SW6, SW7, SW12 and SW15 are connected to the emitters of transistors 141 and 142 respectively. The collectors of transistors 140, 141 and 142 are connected to the +5 V power supply. The bases of transistors 140, 141, and 142 are connected to pins 9, 10, and 11 respectively of PIA 74 through one of resistors 150. Pins 3, 6, 8, 10 and 11 of buffer 77 are connected to pins 29, 31, 30, 33, 32 respectively of PIA 74 through one of resistors 154. Pins 2, 4, 7, 9, and 12 of buffer 77 are connected to the cathodes of diodes D1 through D5 respectively through one of resistors 155. The anodes of the diodes are connected to the +5 V power supply. Pin 1 of buffer 77 is connected to the negative terminal of transducer 59, and to the +5 V power supply through resistor 156. The positive terminal of transducer 59 is connected to the +5 V power supply. Pin 15 of buffer 77 is connected to ground. The LED's D1 through D5 are positioned under switches SW14, SW10, SW11, SW8 and SW9 respectively as indicated in FIG. 4. Each of switches SW1 through SW15 is labelled as indicated under the switch number in FIG. 4.

The preferred electronic components are as follows: Microprocessor 70 is a Motorola MC146805E2 with an internal RAM; PIAs 73 and 74 are type MC146823; non-volatile RAM (NOVRAM) 71 is a type X2444 EEPROM; EPROM 72 is a type 2764; buffers 75, 76, and 77 are type CA3081 transistor arrays; receiver 78 is a type DS1489; transmitter 79 is a type DS1488 and has its own ±12 V power supply which is not shown; latch 80 is a type 74HC573; chip select logic 81 is composed of a type 74LS138 8-bit latch, a Quad 2-input NOR package type 4001, a dual 4-input NAND package type 4002, a Quad 2-input NAND package type 4011, and one inverter from a type 4069BE inverter package; the numbered pins shown in FIG. 2 for the chip select logic are those for the type 74LS138 latch; the logic gates of CSL 81 are connected to decode the address A8–A11 output by the microprocessor to select which of chips 72, 73 and 74 to turn on to receive or send data as determined by the address; LCD interface logic 82 is composed of 3 Quad 2-input Exclusive -OR packages type 4030 which are connected so as to provide the proper signals on the LCD inputs to turn on the LCD segments to display the words and numbers shown on the input and output lines; decoder 83 is a type 4543 4-line to 7-segment decoder-driver for the LCD display; oscillator 84 is a square wave driver to provide the back plane signal to the LCD 60; LCD 60 is a custom LCD which will display the words "oil", "wet", "dry", "error", "alert", "leak", and "probe No." and the numbers 1 through 15; keyboard 64 is composed of two 6 key pads and one 3 key pad connected as shown; transducer 59 is a SONALERT TM TM brand audio alarm module available from Mallory Components Group, P. 0. Box 706, Indianapolis, Ind. 46206; opto-isolators 88A through 88G are type TIL116; relays 62 are optically isolated triacs; crystal oscillator 90 is a 4MHZ oscillator, capacitors 91 and 92 are 27 picofarad; transistors 140, 141, and 142 are type 2N4124; resistors 95 through 98 are 390 ohms, resistors 99 through 102, 106, 107, 150, 154 and 156 are 10K ohm, resistors 103, 104 and 105 are 3K ohm, resistor 111 is 10 megohm, resistors 108 through 110 are resistors 153 are 100K ohm, and resistors 155 are 270 ohm; terminal block 133 is an RS232 connector.

The software program which operates the system and which is stored in EPROM 72 may be preferably described as follows (with the routine names referred to within the program given in parenthesis before the first line of each routine):

(INIT)

Set all port pins to initial states
Clear MPU RAM
Read data from NOVRAM into MPU RAM (restores probe & relay program information)
Initialize timers
Restore LED's to status just before power off
Initialize LCD display

(MONITOR)

(Executive routine which calls the main operating routines)
Do "GETPRB" (read data from next probe)
Do "ERRCHK" (check probe data for invalid states)
Do "ALRMCK" (check probe data for alarm conditions)
Do "CHKALER" (update warning indicators according to any probe alarm or error)
Do "CHKRLY" (update relay outputs according to any probe alarm)
Do "KEYPRC" (process any valid key inputs and execute related command)
Do "CHKRX" (process data in serial receive buffer (if any))
If 6 seconds has not elapsed since last probe was input, loop back to the "KEYPRC" routine
Else continue
Restart 6 second timer
If stop scan flag is set, loop back to the "KEYPRC" routine
Else continue
Go to top of this routine

(GETPRB)

Update current probe pointer
If no alarms programmed for current probe, exit
Else continue
Display current probe number
Output address or current probe on probe bus
Start delay timer (delay until probe returns data)
During delay time, check for key input
If key hit, go process it ("KEYPRC") and when done, reset probe pointer to #1 and jump to top of this routine
Else continue
If delay not done, loop to check for key input again
Else continue
Read probe data from probe bus
Store probe data in probe data array
Update display with new probe data

(ERRCHK)

If current probe has no alarms programmed, exit
Else continue
Check current probe data for invalid states (i.e. DRY & WET)
If no invalid states found, clear error flag for current probe and exit
Else set error flag for current probe and exit

(ALRMCK)

Compare current probe's data to its alarm program
If no match found, exit
Else continue
If error flag already set for current probe, exit
Else continue
If alarm match is "OIL", set alarm flag for current probe and display "LEAK", then exit
Else alarm match is "DRY" or "WET" so set alert flag for current probe and display "ALERT", then exit

(CHKRX)

If no message received by serial port is in buffer, exit
Else if parity error flag set during reception of message, exit
Else if message format is incorrect, ignore message and exit
Else clear message received flag and do "TXPROB" routine to transmit current status of all probes on serial port

(TXPROB)

Set current probe pointer to probe #1
Load ASCII text data and current probe data into transmit buffer
Enable transmission of data via interrupt routine
Loop here until all data has been transmitted
Update current probe pointer
If current probe not past last probe, go to 2nd line of this routine
Else exit

(KEYPRC)

(Check for key input and execute related command if key input found)
If "ALARM CHECK" key hit,
  Save status of display, LED'S and alarm transducer
  Turn on all LCD segments, LED'S and alarm transducer for 2 seconds
  Restore display, LED'S and alarm transducer to previous state
  Exit
If "AUD. ALARM" key hit,
  Toggle alarm transducer disable flag
  Toggle LED behind "AUD. ALARM" key
  Update NOVRAM EEPROM to reflect the new state of this flag
  Exit
If "STOP SCAN" key hit,
  Toggle "STOP SCAN" flag
  Toggle LED behind "STOP SCAN" key
  Update NOVRAM EEPROM to reflect the new state of this flag
  Exit If "PROBE" key hit,
  Clear display
  Reset current probe pointer
  If current probe has any alarm program, display it along with current probe #, and wait for 6 seconds, then continue
  Else increment probe pointer and go to the start of this statement
  Increment probe pointer
  If pointer not past last probe, go to 3rd line of this key routine
  Else exit
If "RELAY" key hit,
  Clear display
  Display program for relay #1 for 6 seconds
  Reset current probe pointer
  If current probe is programmed to activate current relay, display probe number and program for 6 seconds
  Else continue
  Increment probe pointer
  If pointer not past last probe, go to 4th line of this key routine
  Else continue
  Repeat all the above for relays 2, 3, and 4, and then exit
If "EXIT" key hit, then "N.O." key hit, then "DRY" key hit (in that order),
  Then look for next key
  If "PROG" key hit, jump to "PROG" routine
  Else if "N.C." key hit, jump to NOVRAM erase routine
  Else if "EXIT" key hit, return to "MONITR" routine
  Else if 6 seconds go by without a key hit, return to "MONITR" routine
If "ERROR CHECK" key hit,
  Clear Display
  Reset current probe pointer
  If current probe has a current alarm condition, display probe number and probe status
  Else continue
  Increment probe pointer
  If pointer not past last probe, go to 3rd statement of this key routine
  Else continue
  Reset current probe pointer
  If current probe has an error condition, display probe number and probe status
  Else continue
  Increment probe pointer
  If pointer not past last probe, go to 9th statement in this key routine
  Else exit (PROG)

Clear display
Look for next key
If "PROBE" key hit, jump to "PROBE" routine (program probes)
If "RELAY" key hit, jump to "RELAY" routine (program relays)
If "ENTER" key hit, jump to "TXPROB" routine (send probe status over serial port)
If "TEST" key hit, jump to "DIAGNS" routine (run diagnostic test)
If "EXIT" key hit, return to "MONITR" routine
Else if no key hit within 6 second, return to "MONITR" routine (RELAY)

Starting with relay 1,
  Program relay type (N.0. or N.C.)
  Program alarm states (DRY, WET, OIL)
  Assign probes that will control this relay when an alarm occurs
Repeat the above for relays 2, 3, and 4

(PROBE)

Reset current probe pointer
Display current probe number
Display current probe programmed alarm states
Allow operator to alter alarm programming via key input
When done, increment probe pointer
If all probes not done, go to 2nd statement in this key routine
Else continue
Check all probe and relay programs and remove probes from the relay assignments if their alarm program no longer matches that of the relay it was assigned to
Exit (CHKALER)

Check all probe status indications
If any probe has an alarm and/or error condition flagged, display the appropriate indicators and activate the alarm transducer
Else clear all error and alarm indicators and alarm transducer
Exit (CHKRLY)

Check all probe status indicators
If any probe has an alarm condition, then check relay programs, continue
Else exit
If relay programs have alarming probe assigned to them, control relay according to relay program
Else exit (DIAGNS)

Turn on LED behind the "TEST" key
Turn on all display segments
Clear all port pins
Wait until "EXIT" or "PROG" keys are hit
If "EXIT" hit, jump to "INIT" routine to restart program
If "PROG" hit, continue
Clear display
Cycle thru each display segment individually as "PROG" key is hit
Cycle thru the lighting of each LED
Toggle alarm transducer
Toggle serial output port, then read and display level on serial input port so that serial I/D can be checked by connecting them together for diagnostic routine
Toggle each relay
Cycle thru all probes, displaying probe number and current probe data
Enter keyboard test, which displays a numeric code for each individual key on the keypad. To exit this test, push 2 keys at the same time
Jump to "INIT" routine to restart program The software also contains routines for controlling the reading, writing, enabling, disabling, and transfer of data from NOVRAM 71 to microprocessor RAM and RAM to NOVRAM, the control of serial data reception and transmission, the control of the transducer's on, off and pulse states, the control of the pulsing LCD indicators, and the control of keypad scanning and debouncing. It also contains timing routines which shall be discussed below. The preferred embodiment of the software is in a microfiche appendix.

The electronic design of the fluid detector according to the invention is selected to provide maximum protection from false alarms due to extraneous inputs. This is obtained by the selection of CMOS low-power components, opto-isolators, buffered interfaces, and ground loop de-coupling capacitors between power and ground on all devices. Additional fault-avoidance features are provided in software, via debounce coding and sensor diagnostics.

In the preferred embodiment up to fifteen probes may be connected to the probe terminals 120 through 128 via an eight wire cable, although the invention is not limited to that number. RS232 communication port 133 allows the detector to be hard-wired to a remote printer, terminal, computer or modem, such as 68. The four relay terminals 115 may be connected to any number of devices, such as a remote audible alarm, a telephone dialer, a pump or other motor etc. As indicated above, the various chips and circuits are connected to power sources and other electronics to provide power, orderly start-up etc. as described in the instructions that are provided by their manufacturers.

The system operates as follows. Upon start-up, the port pins are set to their initial states, the memory in microprocessor 70 is cleared and the data is read from the NOVRAM memory 71 into the microprocessor memory. Using this data, the microprocessor initializes the timers 56 and LCD 60 and restores the system to the status prior to power off. The system then goes into the monitor mode (MONITR routine). The first probe number in digital format is placed on pins 31, 32, 33 and 34 of PIA 73, which causes the probe to respond with its status on inputs 124, 125 and 126 which causes corresponding status signals to be placed on pins 10, 9, and 11 respectively of PIA 73, which signals are read into memory. Similarly, each probe is read in sequence, the data is checked for invalid states, then compared to the probe's selected alarm condition. If one or more alarm conditions are met the proper LEAK or ALERT descriptor on the LCD display 60 are pulsated on and off, depending on the alarm state. This is accompanied by a continuous audible alarm on transducer 59. For a primary alarm state (OIL), the LEAK descriptor is pulsated, while the audible alarm gives a continuous tone. For a secondary alarm state (WET or DRY), the ALERT descriptor is pulsated, while the audible alarm gives a continuous tone. The system also monitors each probe for functionality. If a probe should become disabled, or its instrumentation wiring severed, the ERROR descriptor will be enabled and a pulsating audible alarm activated.

If a primary alarm state (OIL) and a secondary alarm state (WET or DRY) exist simultaneously, the primary alarm state has priority and the LEAK descriptor will pulsate accompanied by a continuous audible alarm. Likewise, the primary and secondary alarm states both have priority over the ERROR state.

To determine which probe(s) are alarming, the ERROR key is depressed. This will silence the audible alarm 59. The flashing LEAK or ALERT descriptor will stay on continuously and the PROBE NO. descriptor will cycle and display the alarming probes at six second intervals. At each probe number displayed, the proper OIL, WET or DRY alarm descriptor will be displayed, along with respective LEAK or ALERT descriptor. To freeze the cycling mode for any probe number, the STOP SCAN key is pressed. An LED in the keypad will illuminate to indicate the system is in the STOP SCAN mode. Depressing the key a second time will return the system to the scan mode. When all the alarming probes have been scanned, the system will return to the normal monitoring mode unless the ERROR descriptor is also enabled indicating a system problem. If so, the controller will first cycle the probes displaying failure conditions before returning to the normal monitoring mode.

Similarly, if the ERROR descriptor is pulsating, the probe(s) that are in an invalid condition may be determined by depressing the ERROR key. The system will first cycle any probe numbers that are in an alarm mode. This will then be followed by a cycling of probe numbers in error (invalid condition). If there are no alarming probes, the system will immediately go into the routine for cycling the probe(s) that are giving the error conditions. During the cycling period, the ERROR descriptor will be on, and the PROBE NO. descriptor will identify the probes with the invalid states (i.e., indication of multiple states, or no state). The OIL, WET and DRY descriptors will be enabled accordingly for each probe identified. Again, to freeze the cycling mode for any probe number the STOP SCAN key is depressed. An LED in the keypad will illuminate to indicate the mode that is enabled. A second push of the key will extinguish the LED and return the system to the scan mode. When all the probes with invalid conditions have been identified, the system will return to the monitor mode.

Still in monitor mode, after the warning indicators and alarms are set by the system, the selected relay alarm conditions are checked and if a particular probe that is selected for that relay is alarming the relay is set as programmed. The keyboard is then scanned and if a keyboard entry has been made, the system performs the function assigned to the key(s) pressed. If the proper entry for entering the program mode has been entered, the system exits the monitor mode and enters programming mode (see below). Upon returning from programming mode (or if program mode is not entered) the software directs the system to check the serial data receive buffer 78 for a signal. If a message has been received, the message is checked for correct parity and proper format and if both are satisfactory, the system transmits the current status of the probes.

Figure 6:
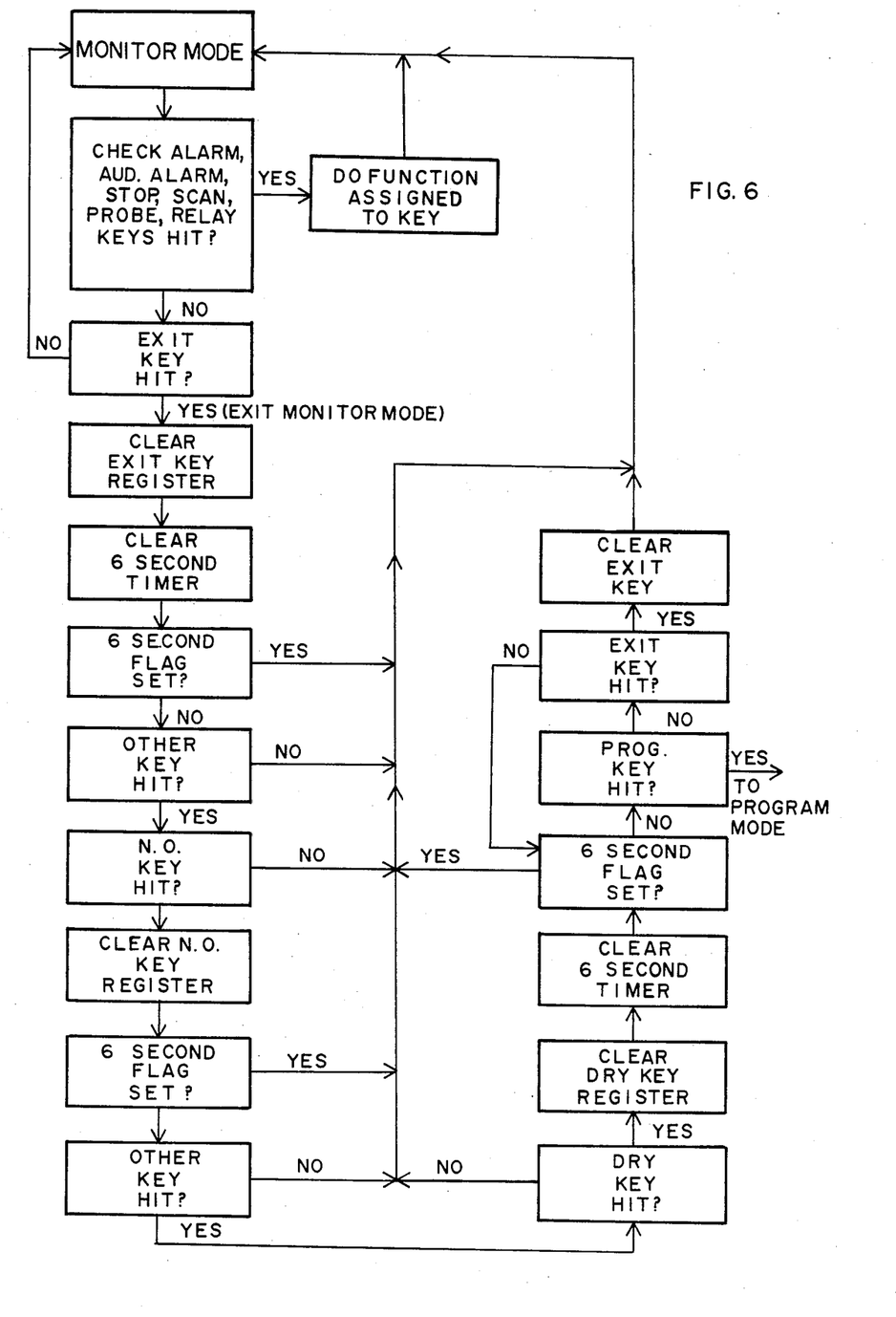
FIG. 6 is a flow chart showing the steps related to the time out functions in the preferred embodiment of the software for transferring the microprocessor from monitor mode to programming mode.
Figure 7:
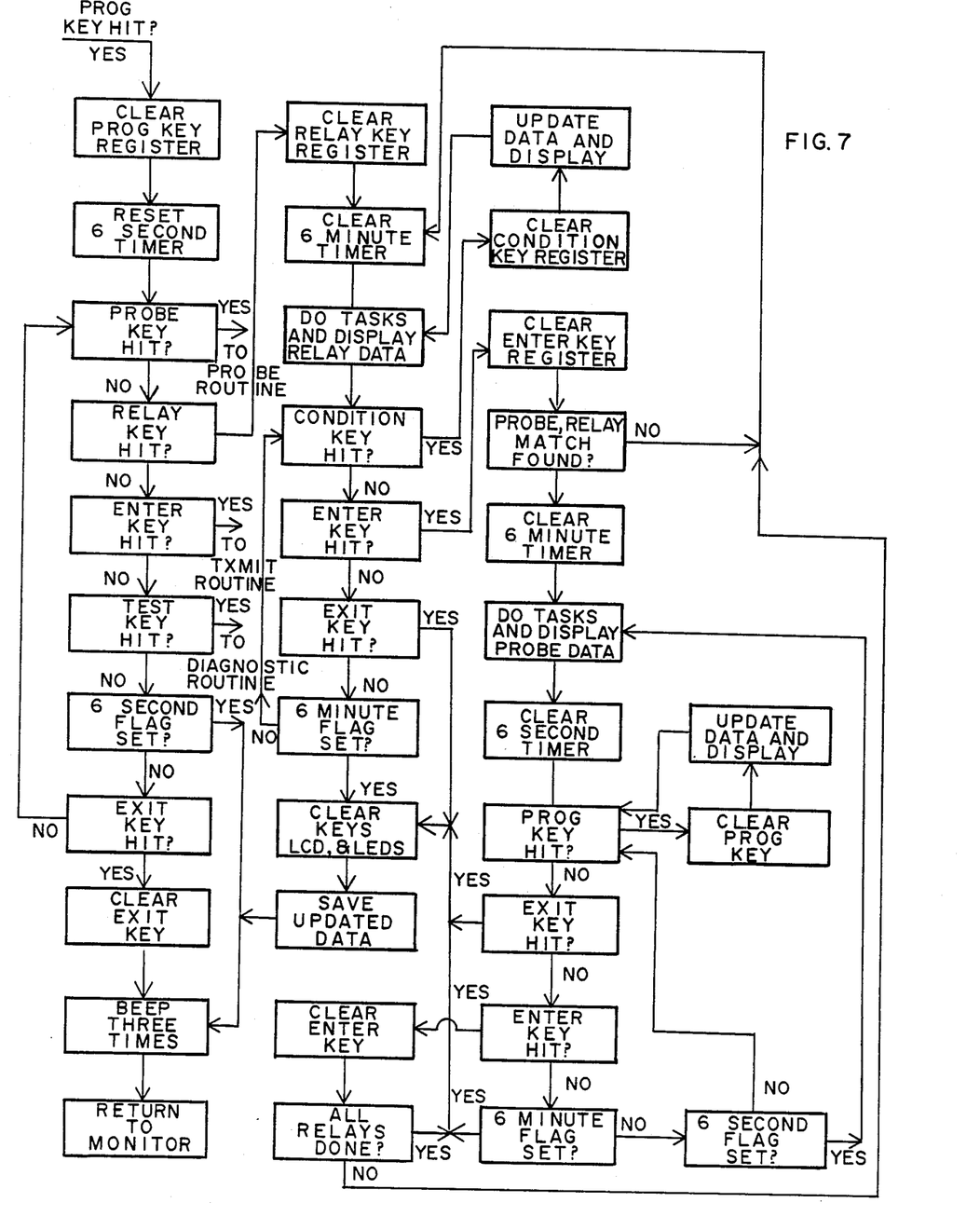
FIG. 7 is a flow chart showing the steps related to the time out functions in the software for entry into the programming, test, and transmission modes and in the relay programming mode.
Figure 8:
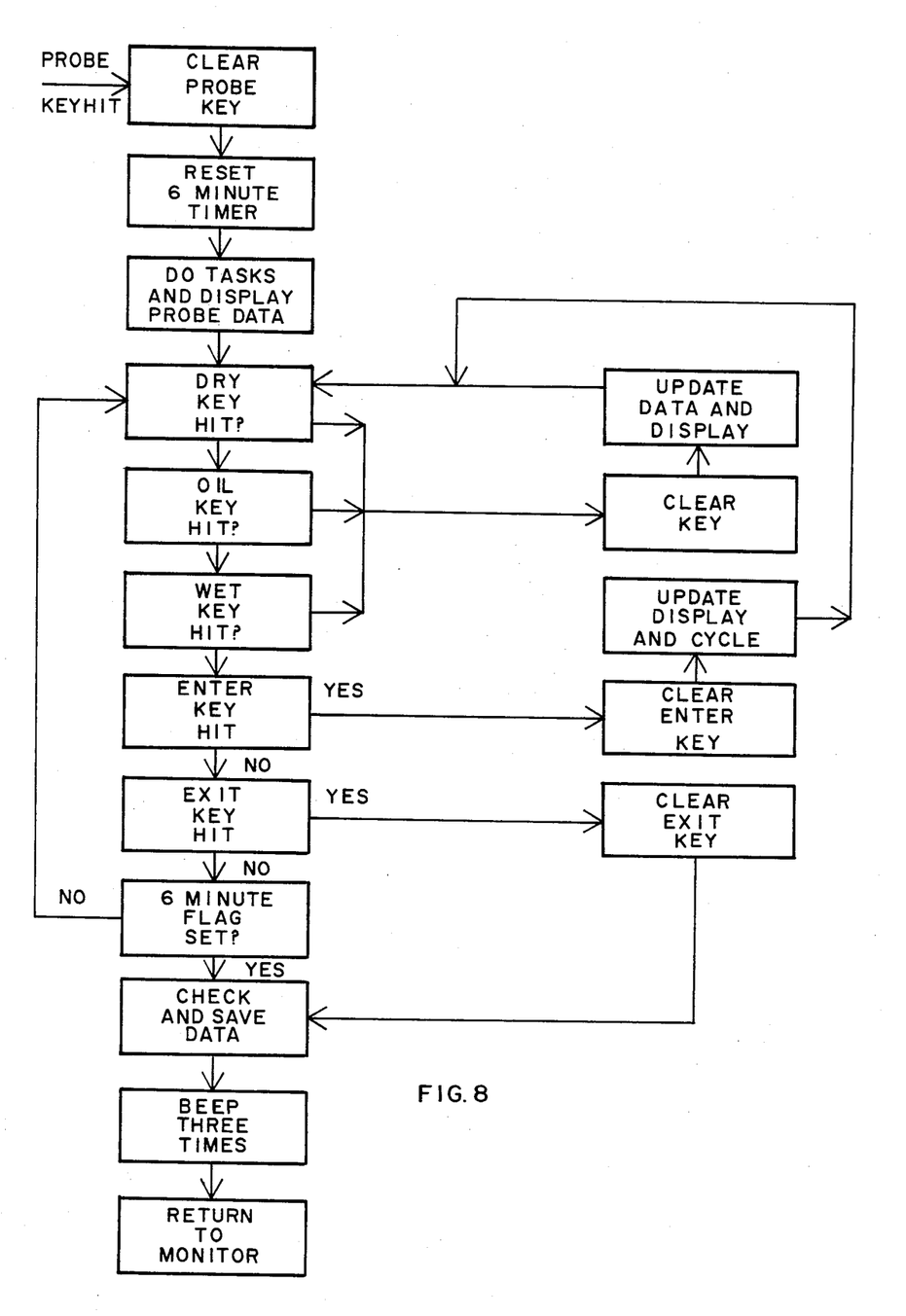
FIG. 8 is a flow chart showing the steps related to the time out function in the probe programming mode.
Figure 9:
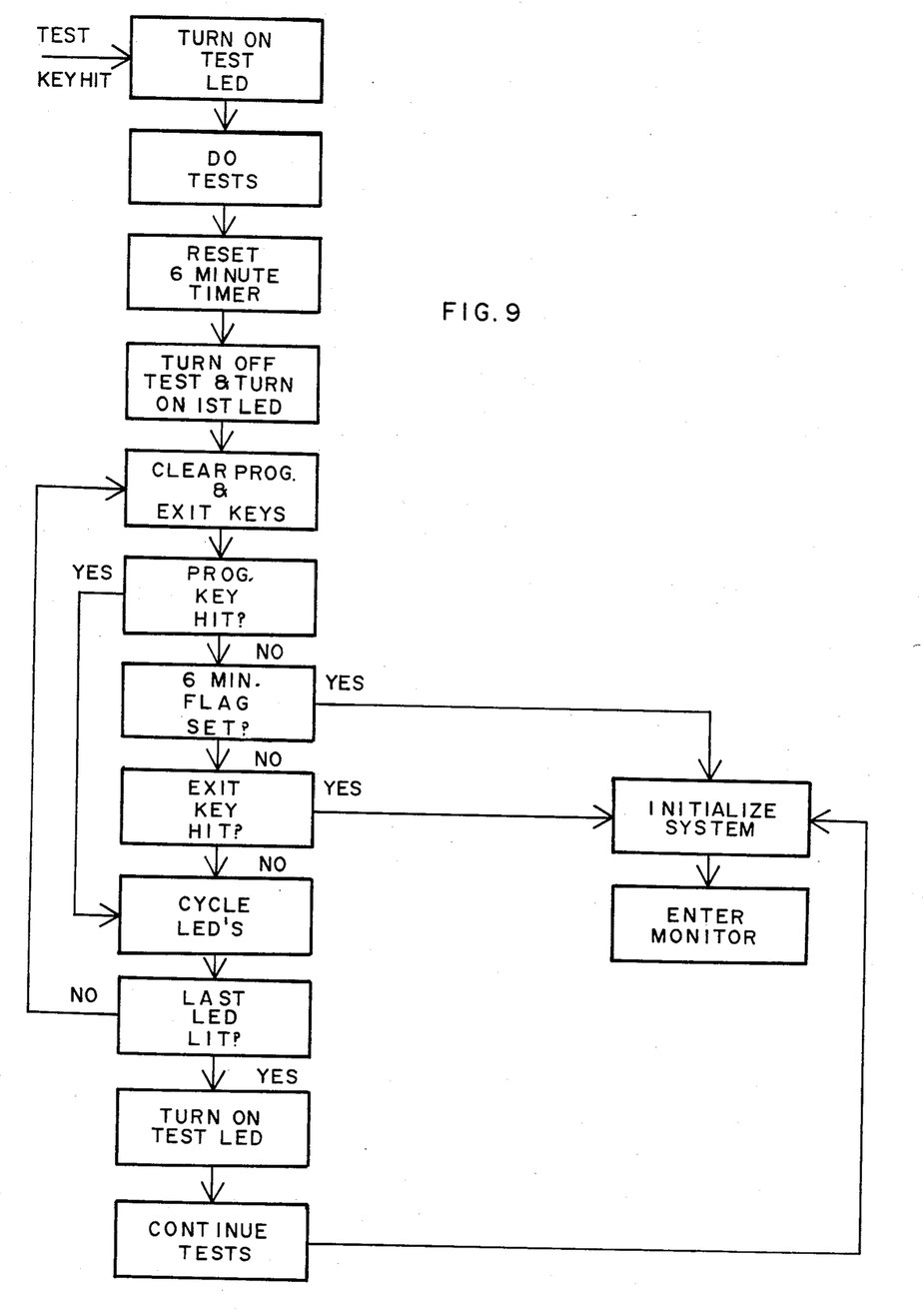
FIG. 9 is a flow chart showing the steps related to the time out function in the test mode.

If it is desired to program the system (see FIGS. 6, 7 and 8), a security code consisting of three keys pressed in order (in the embodiment described, these are EXIT, NO.O. and DRY) is entered on the keypad then the PROG key is pressed. The system then enters the program mode the next time it checks the key inputs (which occurs several times in the monitoring loop and also in the data reading (Get Prob) routine). In the program mode, pressing the PROBE key will cause the system to enter the probe programming mode (FIG. 8). Probe No. 1 is displayed on the LCD 60, whereupon the alarm condition keys (DRY, OIL, WET) may be pressed to select any combination of conditions desired. The conditions selected are displayed on the LCD 60. The ENTER key is then pushed and the selected conditions are stored in the microprocessor memory. The system then sequences to the next probe number. When all probes have been programmed, the system checks the selected conditions against the conditions the relays are set to and removes the probes from their assignments to a relay if the selected conditions do not match those of the relay. Similarly, the relays may be programmed when the RELAY key is pressed in the program mode (FIG. 7). The first relay number will appear on the LCD and the relay latching condition may be selected to be normally open (N.O.) or normally closed (N.C.) by pressing the appropriate key. The LED, D4 or D5, under the respective N.O. or N.C. key will illuminate to indicate the condition selected. The relay alarm conditions may be selected, again as any combination of OIL, WET, or DRY, by pressing the appropriate key. The selected conditions will be displayed. The ENTER key is then pushed to store the relay latching and alarm conditions. The probe numbers that are programmed to the same conditions will then cycle on the LCD display. If the PROG key is pressed while a probe number is displayed, that probe will be assigned to the relay. If a probe has been selected to activate a relay, the probe alarm state descriptor on the display 60 that corresponds to the selected relay alarm condition will flash. If a probe has been previously programmed to alarm, or mistakenly programmed to alarm, the probe can be removed from those selected by pressing the PROG key when the probe number is displayed. If the ENTER key is then pressed again, the probes selected will be stored in the microprocessor memory and the system cycles to the next relay.

If the ENTER key is pressed after the security code and PROG keys have been pressed, then the probe status will be transmitted via the RS-232 port. The EXIT key may be used to exit from the programming or test mode to the monitor mode. Pressing the ALARM CHECK key will test the functionality of all audible and visual components. The audible alarm 59 will sound, the entire LCD display 60 will be activated, and the five keypads indicated in FIG. 4 will be illuminated. The AUD ALARM key disables the alarm 59 when depressed once and reinstates it if depressed a second time. LED D1 illuminates under the key when the alarm 57 is disabled. Depressing the ERROR key will sequence the alarming probes, showing probe number, alarm descriptor, and programmed alarm state. After the alarming probes are sequenced, the system will sequence failed probes showing probe number, error descriptor, and cause of alarm, e.g., two states indicated (oil and water) or no states. When the PROBE button is pressed in monitor mode, the display will cycle a review of the selected alarm conditions of each probe. Similarly, pushing the RELAY button will cycle the programmed relay states. When the relay programmed states are reviewed as above, the LED inside the N.O. and N.C. buttons illuminate to indicate the selected latching conditions. Pressing the TEST key after the security code is entered and the PROG key is pressed will cause the self-diagnostic routine (DIAGNS) described above to be performed (FIG. 9). During this routine, the LED D2 beneath the TEST button, SW10 will illuminate. Pressing the STOP SCAN button in the monitoring mode will freeze the cycling of the probes. The LED D3 beneath the STOP SCAN button will illuminate. A second push of the button will return the system to the normal scan mode.

A feature of the system is that it provides a time out function in most non-monitoring modes, which function returns the system to the monitor mode upon the expiration of a predetermined time, which is preferably approximately six seconds or approximately six minutes depending on the particular functions which are in process. The timing for these time out functions is provided by a software timer shown in FIG. 5. The microprocessor has an internal clocking signal which operates at 800,000 hertz with a 4 MHZ oscillator 90. A counter in microprocessor 70 functions as a hardware timer to divide the 800,000 hertz signal by 160 and interrupt the microprocessor routine 5000 times a second and send the microprocessor to a timing routine (TIMINT). This routine performs a number of housekeeping functions in addition to the timing function shown in FIG. 5. (It is important to note that the flow-charts in FIGS. 5 through 9 show only sufficient steps to illustrate the timing functions of the particular routines they depict; the routines also include many other sub-routines and steps which are not shown. In some instances, such as the "Clear Condition Key" and "Update Data and Display" steps in FIG. 7, a step shown will represent several sub-routines which will be different depending on the condition key hit or the part of the cycle the system is in. These instances are clear from the context.) The software timer further divides the 5000 hertz hardware signal by 450 to provide an approximately 1/10 of a second timer. (In the preferred embodiment this is about 1/11.11 seconds. A second software timer loop further divides the 1/10 second signal by 60 to provide an approximately six second timing signal flag. A third software time loop divides the six second signal by 60 to provide an approximately six minute timing signal flag. These approximately six second and approximately six minute flags are used in the programming mode, test mode and other modes to return the system to monitoring mode. As shown in FIG. 6, upon the pressing of the EXIT key in monitor mode the software resets the six second timer and places the system in monitor mode if the N.O. and Dry keys are not hit within six seconds. If they are hit, the six second timer is reset, and if the PROG key is hit, the six second timer is again reset and another six seconds is provided to hit either the RELAY, the PROBE, the ENTER, or TEST keys, each of which will send the program to one of the routines shown in FIGS. 7 (RELAY), 8 (PROBE), 9 (TEST) or to the TXPROB subroutine (not shown). If the RELAY key is hit the six minute timer is reset and if the predetermined approximately six minute time is clocked before the ENTER (or EXIT) key is hit the system will be returned to monitor mode. If the ENTER key is pressed, he six minute timer is reset and the system is placed in monitor mode if the six minute clock elapses before the probe 21 assignments are entered. In this case, pressing the PROG key to make a probe assignment clears the six second timer which will delay the six minute timer since the six minute timer runs off the six second timer. Each time the six second timer is clocked the system cycles to the next probe. If the probe assignments are entered by pressing the ENTER key, the six minute timer is reset and the system cycles to the next relay, unless all relays are done, in which case the system is returned to monitor mode.

If the PROBE key entry is made after the program mode is entered, the software directs the processor to reset the six minute timer and the system is returned to monitor mode if alarm conditions are not entered by pressing the enter key before the six minute time is clocked. If the TEST key is pressed after the program mode is entered, then the test mode (DIAGNS routine) is entered. The TEST LED is illuminated during most of this routine and thus it is evident that the system is in test mode. However, during a portion of the routine the LEDs are tested and it is thus not evident that the test mode is in process. Just prior to the testing of the LEDs, the six minute timer is reset and the TEST LED is turned off. The LEDs are then cycled on by pressing the PROG key. If the six minute clock expires before the last LED is cycled, then the system goes to the initializing routine (since the DIAGNS routine may have left registers uncleared or in a state not appropriate to monitor mode) and the monitor mode is then re-entered.

It is a feature of the invention that both probes in wells outside of tanks and probes placed between the walls of double-walled tanks may be effectively monitored at the same time. For the probe numbers for the outside of tank probes generally the "oil" alarm condition alone would be selected. For the between the wall probes, both "oil" and "water" alarm conditions would be selected. In this case, the "oil" alarm would indicate a leak in the inner tank and a "water" alarm would indicate a leak in the outer tank. Further, in some locations ground water may exist normally at one external probe but not at another and the probe alarms conditions may be set accordingly.

A novel fluid detector has been described. It is evident that those skilled in the art may now make many uses and modifications of the specific embodiment described, without departing from the inventive concepts. For example, other equivalent electronic parts may be used or other non-monitoring modes may be included with time out functions. Consequently, the invention is to be construed as embracing each and every novel feature and novel combination of features present in the fluid detector described.

What is claimed is:

1. A fluid detector comprising:
    a plurality of probe means for sensing their fluid environment, each probe means including means for providing one or more of the following probe signals: a hydrocarbon signal indicative of the presence of hydrocarbon in the probe environment, a water signal indicative of the presence of water in the probe environment, and a dry signal indicative of a dry probe environment;
    manual entry means for selecting one or more alarm conditions;
    memory means for storing said one or more selected alarm conditions;
    timing means for clocking a predetermined time;
    processing means for receiving said selected conditions and storing them in said means for storing and for monitoring said probe signals and providing an alarm signal upon receiving one or more probe signals corresponding to one or more of said selected alarm conditions, said processing means capable of operating in a monitoring mode in which it monitors and processes said probe signals and a programming mode in which it receives and stores said one or more selected alarm conditions;
    means for resetting said timing means upon entry of one or more predetermined entries on said manual entry means and for placing said processing means in said monitoring mode after said timing means clocks said predetermined time; and
    alarm means responsive to said alarm signal for providing an alarm.

2. A fluid detector as in claim 1 wherein said timing means comprises a means for clocking a first predetermined time and a second predetermined time, and said means for placing comprises a means for placing said processing means in said monitoring mode after said timing means clocks said first predetermined time during a first portion of said programming mode and for placing said processing means in said monitoring mode after said timing means clocks said second predetermined time during a second portion of said programming mode.

3. A fluid detector as in claim 2 wherein said alarm means includes one or more relays, said processing means further comprises a means for latching one or more of said relays upon receiving one or more probe signals corresponding to one or more of said selected alarm conditions, said programming mode includes a probe programming mode and a relay programming mode, said manual entry means includes a means for selecting one of said probe and relay programming modes, said first portion of said programming mode comprises a portion in which the next proper entry is the selection of one of said probe and relay programming modes, and said second portion of said programming mode is a portion in which said alarm conditions are to be selected and entered.

4. A fluid detector as in claim 3 wherein said first predetermined time is approximately six seconds and said second predetermined time is approximately six minutes.

5. A fluid detector as in claim 1 wherein said manual entry means also comprises a means for entering a security code, said timing means further comprises a means for clocking a first predetermined time and a second predetermined time, and said means for resetting and placing further comprises means for placing said processing means in said programming mode if a predetermined security code is entered within said first predetermined time.

6. A fluid detector as in claim 1 wherein said programming mode includes a probe programming mode and said one or more predetermined entries include an entry to enter said probe programming mode.

7. A fluid detector as in claim 6 wherein said predetermined entries further include an entry to enter one or more selected probe alarm conditions.

8. A fluid detector as in claim 1 further comprising a plurality of relays, and wherein said manual entry means further comprises a means for selecting one or more relay latching conditions, said processing means further comprises a means for latching one or more of said relays according to said selected latching conditions upon receiving one or more probe signals corresponding to one or more of said selected alarm conditions, said programming mode includes a relay programming mode, and said one or more predetermined entries include an entry to enter said relay programming mode.

9. A fluid detector as in claim 8 wherein said predetermined entries include an entry to enter one or more selected relay latching conditions.

10. A fluid detector as in claim 1 wherein said alarm means includes one or more relays, said manual entry means includes a means for assigning one or more probes to activate one or more relays, said processing means includes a means for receiving said probe-relay assignments and storing them in said means for storing and a means for activating one or more of said relays upon receiving one or more probe signals from their assigned probes, wherein said programming mode includes a probe-relay assignment mode, and wherein said one or more predetermined entries includes an entry to enter said probe-relay assignment mode.

11. A fluid detector as in claim 10 wherein said one or more predetermined entries further includes an entry to enter the one or more probes assigned to one or more relays.

12. A fluid detector as in claim 1 wherein said processing means further comprises means for testing the various parts of said fluid detector and is capable of operating in a test mode in which the various parts of the detector are tested, wherein said detector further includes a visual means for visually indicating that said processing means is in said test mode, and wherein said means for placing further comprises a means for placing said processing means in said monitoring mode after the clocking of said predetermined time when said visual means is being tested.

* * * * *